J. D. ELLIOT,

Assignor to the ROGERS UPRIGHT PIANO Co.

Stringing Device for Piano-Fortes.

No. 7,933. Reissued Nov. 6, 1877.

Witnesses

J. N. Chauncey.

Clara Broughton.

Jos. D. Elliot

Inventor

By atty.

Wm. E. Earle.

N. PETERS, PHOTO-LITHOGRAPHER, WASHINGTON, D. C.

UNITED STATES PATENT OFFICE.

JOSEPH D. ELLIOT, OF NEWTON, ASSIGNOR TO THE ROGERS UPRIGHT PIANO COMPANY, OF BOSTON, MASSACHUSETTS.

IMPROVEMENT IN STRINGING DEVICES FOR PIANO-FORTES.

Specification forming part of Letters Patent No. 179,903, dated July 18, 1876; Reissue No. 7,933, dated November 6, 1877; application filed February 5, 1877.

*To all whom it may concern:*

Be it known that I, JOSEPH D. ELLIOT, of Newton, in the county of Middlesex and State of Massachusetts, have invented a new Improvement in Tension Devices for Piano-Forte Strings; and I do hereby declare the following, when taken in connection with the accompanying drawings, and the letters of reference marked thereon, to be a full, clear, and exact description of the same, and which said drawings constitute part of this specification, and represent, in—

Figure 1:
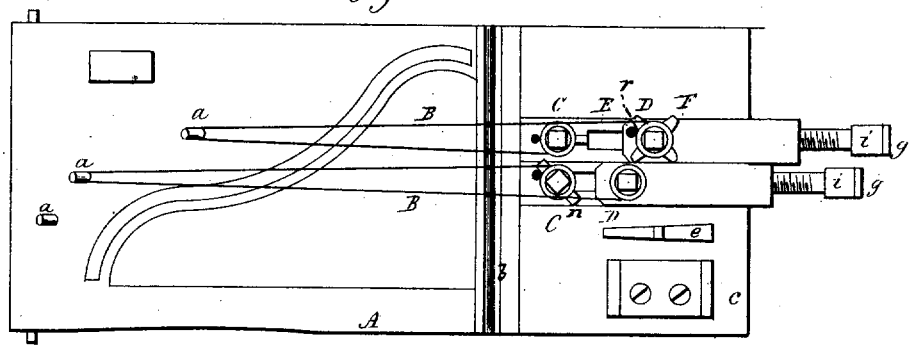
Figure 2:
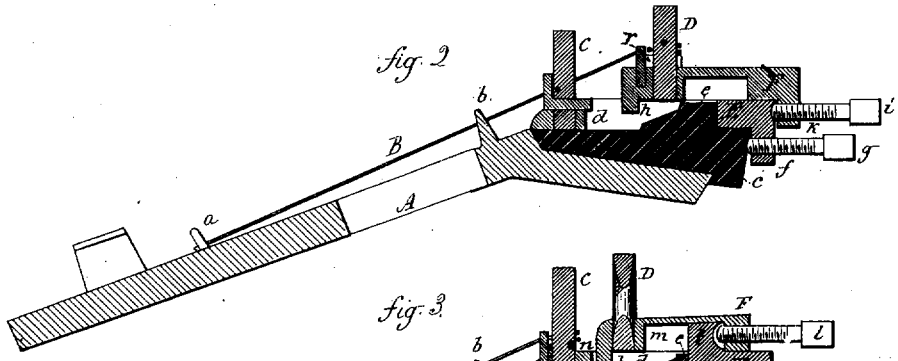
Figure 3:
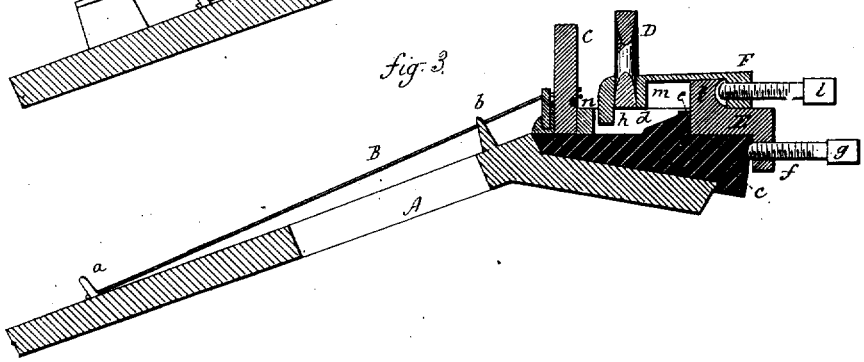

Figure 1, a top view, and in Figs. 2 and 3 longitudinal sections, of part of the metallic string-frame of a piano-forte, with my invention applied to two of its strings.

Figure 4:
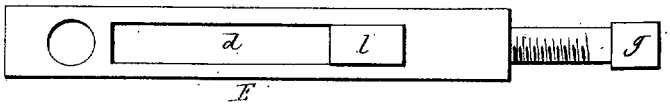

In the said drawings, A denotes the string-frame, of which *a a* are the hitch-pins, and *b* the bridge. Each of the strings B is bent at or near its middle half-way around a hitch-pin, *a*, while near its two ends such string is extended through and wound about two rotary pins, C D, extending upward from a pair of slides, E F, one of which rests on the other, and the latter on the hooked support-bar *c* of the frame. The lower, E, of each pair of slides E F is slotted lengthwise, as shown at *d* in the aforesaid drawings, and also in Fig. 4, which is a top view of the said slide, to receive a lug, *e*, extending up from the bar *c*, which, with the slot, serves to guide the slide rectilinearly while it is in movement, as well as to aid in supporting it in place.

Furthermore, each of the lower slides E has an ear, *f*, extending down from it at its rear end, and in rear of the plate or bar *c*. A screw, *g*, screws into and through such ear, and against the next adjacent edge of the plate or bar *c*.

The upper slide F, at its front end, is provided with a projection, *h*, to enter the slot of the lower or fellow slide, and to each of the said upper slides F there is a screw, *i*, which, in Fig. 2, is shown as screwed into and through an ear, *k*, extending down from the slide F and in rear of the fellow or lower slide, and against the end thereof. The said screw *i* is shown in Fig. 3 as screwed into the end of the slide F and against a projection, *l*, extending up from the fellow slide into a slot or groove, *m*, made lengthwise in the upper slide.

In order to prevent the pins C D from turning when the strain is made upon the wires through the slides carrying the said pins, and thereby loosen or slacken the wires, a stop is provided for the pins. This may be a pin resting in a slot in the slide, and transversely through the pin C or D, as seen at *n*, Figs. 1 and 3; or the pin C or D may be provided with a series of teeth or studs projecting from it to co-operate with a stud inserted in the slide, as seen at *r*, Figs. 1 and 2.

To adjust the tuning-pin, remove the stop-pin, and turn the tuning-pin to the desired position, then replace the stop-pin.

From the above it will be seen that the two adjusting or straining screws *g i* of each pair of slides E F do not impinge against one common lug or projection extended from the bar *c* up through slots in both slides, as is the case with each pair of string-slides shown and described in the United States Patent No. 171,047, granted on the invention of Charles E. Rogers, but that the screw of the upper slide impinges directly against either the end of the lower slide or a projection extending up from said lower slide, such modification being attended with a highly-important advantage or result, viz., the ability to strain both branches of the string at once by revolving the screw of the lower slide, which will cause both slides to be simultaneously drawn backward. Thus, with my improvement, it will be observed that, by the two screws, both branches of the string may be brought or strained into unison with one another, and afterward, by simply turning the lower screw, the pitch of both may be varied simultaneously; whereas, were the screws of the pair of slides to work against a common lug projecting up from the support-bar *c*, the pitch of the branches could not thus be obtained, but would have to be determined by moving both screws, with the liability of unequally straining the branches. By moving back both slides simultaneously, by a single screw, they will be equally strained, and can be readily and quickly brought to the right pitch after having been strained in unison.

The straining-screw of the lower of the pair of slides, instead of abutting directly against the edge of the support-bar, may be screwed into the end of the slide of such screw, and against a lug or projection, to extend up from the said bar into a slot or chamber in the slide, this latter arrangement and application of the screw with reference to the slide and support-bar being a mechanical equivalent for the ear extended from the slide, with the screw screwed through such ear and against the edge of the bar.

I do not claim the combination of the slotted slide, its straining-screw, and wire fastening-pin. Nor do I claim a pair of such slides arranged on a lug extending up from the support-bar, and having the ends of the straining-screws of said slides abutting directly against it, all as represented in the aforesaid patent.

I claim—

1. In a pair of slides provided with straining-screws and wire fastening-pins, as described, the straining-screw *i* of the upper slide F, applied to screw or work against the lower slide E or a projection, *l*, therefrom, in combination with the screw *g* of said lower slide, arranged to impinge or screw against the support-bar *c* or a projection therefrom, all being substantially as set forth.

2. In the piano-forte-string straining mechanism, as described, either or each wire-straining slide of the pair E F, as provided with the ear *f* or *k* extended down its rear end, and having its moving-screw *g* or *i* screwed through such ear, as represented.

3. The rotative straining or tension pins of a piano-forte, combined with a removable stop to allow the adjustment of, and prevent the strain upon the wires from turning the pins, substantially as described.

J. D. ELLIOT.

Witnesses:
A. E. MANNING,
B. F. BAKER.